(12) United States Patent
Sasayama (10) Patent No.: US 8,011,313 B2
(45) Date of Patent: Sep. 6, 2011

(54) HULL STRUCTURE

(76) Inventor: Kuniyoshi Sasayama, Saga (JP)

( * ) Notice: Subject to any disclaimer, the term of this patent is extended or adjusted under 35 U.S.C. 154(b) by 239 days.

(21) Appl. No.: 12/379,654

(22) Filed: Feb. 26, 2009

(65) Prior Publication Data

US 2009/0165693 A1 Jul. 2, 2009

(51) Int. Cl.
*B63B 1/16* (2006.01)
(52) U.S. Cl. ........................................ 114/271
(58) Field of Classification Search ................. 114/271; D12/300, 310–314
See application file for complete search history.

(56) References Cited

U.S. PATENT DOCUMENTS 5,419,274 A * 5/1995 van Diepen ................. 114/271

FOREIGN PATENT DOCUMENTS

JP 05-338582 12/1993
JP 2006-008091 1/2006

* cited by examiner

*Primary Examiner* — Ed Swinehart
(74) *Attorney, Agent, or Firm* — Rader, Fishman & Grauer PLLC (57) ABSTRACT

A hull structure has a chine serving as a boundary between a broadside and a bottom of a hull. The hull has a configuration in which the hull has a maximum depth in a vicinity of a central position of the hull, the chine is provided so that its level position becomes gradually lower from a bow side toward a stern side, and the bottom has a cross-section having a substantially V-shape from the bow toward the stern, the V-shape having an inner angle becoming gradually smaller within a range of from about 80° to 100° from the bow toward a central portion of the hull and becoming gradually larger from the central portion thereof toward the stern.

3 Claims, 6 Drawing Sheets

HULL STRUCTURE

BACKGROUND OF THE INVENTION

1. Technical Field

The present invention relates to a hull structure mainly containing a bottom, for a so-called planing type high-speed vessel and more particularly to the hull structure, which permits a stable high-speed cruising even in wavy conditions 2. Background Art There have recently been a strong demand that even a small fishing or pleasure boat is designed to be capable of cruising at a high speed whenever necessary, in order to shorten the amount of time required for cruising for movement on the water. As a result, various types of hull forms suitable for a high-speed cruising have been applied also to such a kind of boat. There have generally been known, as such types of hull forms suitable for a high-speed cruising, a so-called planing boat type hull form in which a chine serving as a continuous edge, which divides a hull into a broadside and a bottom, is usually provided and the bottom has a V-shaped cross section. Japanese Patent Provisional Publication No. H5-338582 describes examples of such a conventional hull structure and Japanese Patent Provisional Publication No. 2006-8091 describes in the column of Background Art the similar structure.

SUMMARY OF THE INVENTION

Technical Problem

As described in the respective prior art documents as identified above, a conventional small high-speed boat has a structure in which the chine, which also serves as preventing sea spray generated during the cruising from moving along the surface of the hull onto a boat deck, is usually designed to be provided so as to pass through a higher position at the bow and a lower position at the stern. Due to the positional relationship of the chine, the inner angle of the V-shaped cross-section of the bottom of the conventional hull becomes gradually larger from the bow toward the stern as described in Japanese Patent Provisional Publication No. 2006-8091. However, in such a conventional hull structure, an angle between the bottom and a horizontal line at the central position of the hull is relatively small. Therefore, the conventional hull structure has a problem that the bottom is liable to be subject to impact by wave, when cruising on wavy conditions, and a high-speed cruising on the wavy conditions is not actually easy.

In addition, the conventional hull has been designed so as to provide a small inner angle of the V-shape of the bottom on the stern side, in view of an important issue of water breaking property in cruising, resulting in an acute angle of V-shape of the bottom. However, when following waves obliquely collide with the hull from behind during the cruising on conditions such as stormy weather in which tidal wave rolls on, the sharp bow may play the role as a kind of rudder body, thus being resistant. As a result, power of the wave may disable the boat from cruising in the desired direction, resulting in lack of stability, and a careenage angle of the hull may become larger, leading to a possible capsizing, and the actual cruising may be extremely difficult, thus causing problems.

An object of the present invention, which was made in order to solve the above-described problems, is therefore to provide a hull structure with an improved shape of the bottom, which permits to reduce, even when wave collides with the hull, an impact by the wave to be capable of cruising at a high speed, in a stable state without careening even in the following wave, thus making it possible to continue cruising without excessively decelerating.

Solution to Problem

A hull structure according to the first aspect of the present invention comprises: a chine serving as a boundary between a broadside of a hull and a bottom thereof, wherein: the hull has a configuration wherein: the hull has a maximum depth in a vicinity of a central position of the hull; the chine is provided so that its level position becomes gradually lower from a bow side toward a stern side; and the bottom has a cross-section having a substantially V-shape from the bow toward the stern, the V-shape having an inner angle becoming gradually smaller within a range of from about 80° to 100° from the bow toward a central portion of the hull and becoming gradually larger from the central portion thereof toward the stern.

According to the first aspect of the present invention, the hull has the configuration in which the chine is provided so that its level position becomes gradually lower from a bow side toward a stern side, and the inner angle of the V-shape of the bottom becomes gradually smaller within the range of from about 80° to 100° from the bow toward the central portion of the hull and becomes gradually larger from the central portion thereof toward the stern, with the result that the inner angle of the V-shape of the bottom at the central portion of the hull becomes more acute. Therefore, the central portion of the hull, which comes into contact with the water surface during a high-speed cruising, permits to attenuate impact by the wave applied to the bottom and make the impact applied to the bottom at the central portion of the hull small even on the wavy conditions, thus making it possible to achieve a safe and smooth cruising. In addition, a distance from the chine to the bottom becomes larger at the central portion of the hull so that the position of the chine may relatively be located upward away from a draft line, so as to decrease frictional resistance, thus making it possible to make the boat fast by the same thrust as the conventional boat and make it more fuel-efficient to reach the same speed as the conventional boat. Further, the inner angle of the V-shape of the bottom on the bow side is designed to become larger, it is possible to prevent the boat from careening due to influence of the following wave and provide a more stable cruising even on the stormy weather conditions.

In the second aspect of the present invention, a difference in level between the chine and a lowermost portion of the bottom, which is located directly below the chine, may be kept substantially constant in a predetermined region of the bottom from the central portion of the hull toward the bow.

According to the second aspect of the present invention, the bottom is provided so as to be formed along inclination of the chine within the predetermined region in the bottom from the central portion of the hull toward the bow, thus reducing resistance against water, and ensuring a state in which the portion of the hull in such a region may serve as the foremost portion, which comes into contact with water surface during a high-speed cruising in a planing state to cut through the waves to cruise in a stable manner.

In the third aspect of the present invention, the hull may have a width in respective portions thereof from a position corresponding to a quarter of an entire length of the hull on the bow side toward the stern is kept substantially constant, said width being within a range of from about 25% to about 30% of the entire length of the hull.

According to the third aspect of the present invention, the width of the hull is substantially constant over almost the whole portion in the longitudinal direction excepting the bow side and determined to be substantially equal to the length corresponding to a quarter of the entire length of the hull. Accordingly, it is possible to achieve a bottom shape of the bow side, which has a reasonable shallow angle relative to the horizontal line, thus being insusceptible to influence of the following wave and providing the hull having the sufficiently width to impart an excellent lateral stability to the hull, and permitting a smooth cruising on the water.

DESCRIPTION OF EMBODIMENTS

Now, the hull structure according to the first embodiment of the present invention will be described in detail below with reference to FIGS. 1 to 7.

As shown in FIGS. 1 to 7, the hull structure according to the first embodiment of the present invention has a configuration in which there is provided a chine 13 serving as a boundary between a broadside 11 of a hull 50 and a bottom 12 thereof, the chine is provided so that its level position becomes gradually lower from a bow side toward a stern side, and the bottom has a cross-section having a substantially V-shape from the bow toward the stern.

More specifically, the hull structure has the configuration in which the chine 13 has positional level points in the longitudinal direction thereof; each of the positional level points is represented by a horizontal distance from the bow side to the stern side and a vertical distance from a reference horizontal line; the positional level points are provided so that the vertical distance becomes gradually larger with increasing horizontal distance, and the hull is provided with the bottom 12 with a cross-section having a substantially V-shape from the bow toward the stern.

Figure 2:
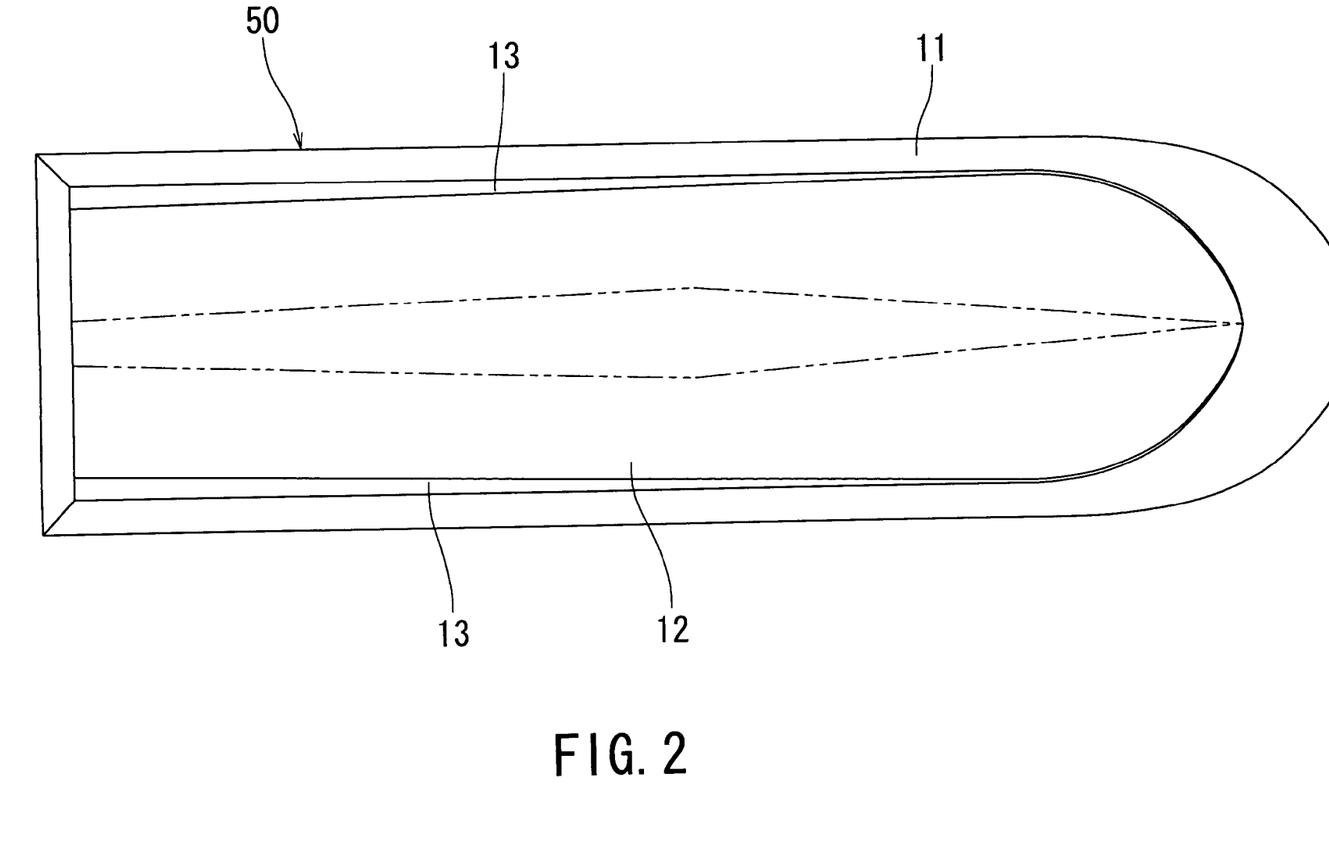
FIG. 2 is a bottom view illustrating the hull structure according to the first embodiment of the present invention.
Figure 3:
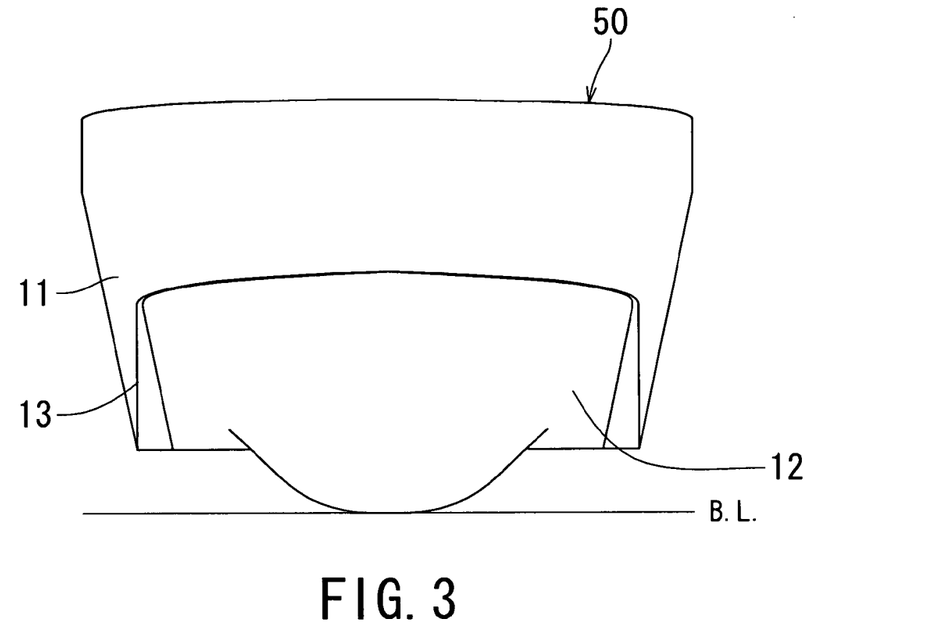
FIG. 3 is a front view illustrating the hull structure according to the first embodiment of the present invention.
Figure 4:
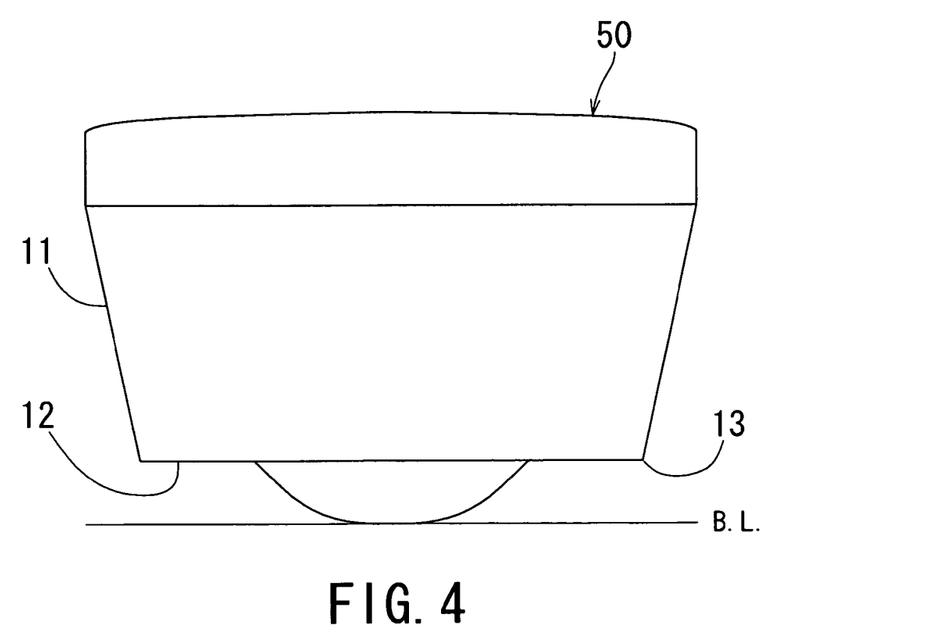
FIG. 4 is a rear view illustrating the hull structure according to the first embodiment of the present invention.

As shown in FIG. 2, the above-mentioned hull 50 has a hull configuration in which a width of the hull in respective portions from a position 8, which is located rearward from a fore "D" to a position corresponding to a quarter of the entire length of the hull on the bow side toward the end "E" of the stern, is kept equal to each other and within a range of from about 25% to about 30% of the entire length of the hull. The hull has a depth, which gradually increases from the bow side toward the central position of the hull, reaches the maximum in a predetermined region including the central portion of the hull, and decreases from the central portion thereof toward the stern.

Figure 5:
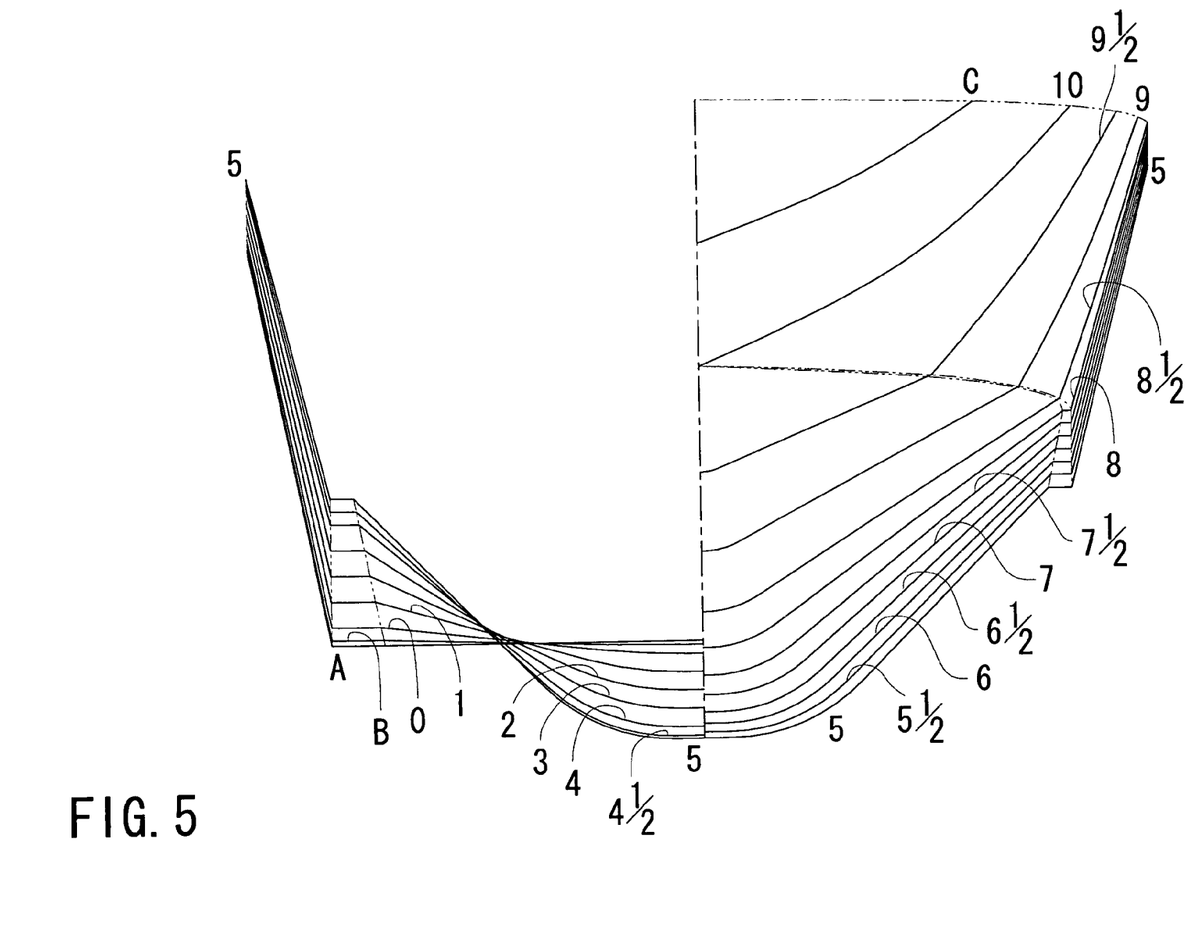
FIG. 5 is a front sheer draft for the hull structure according to the first embodiment of the present invention.
Figure 6:
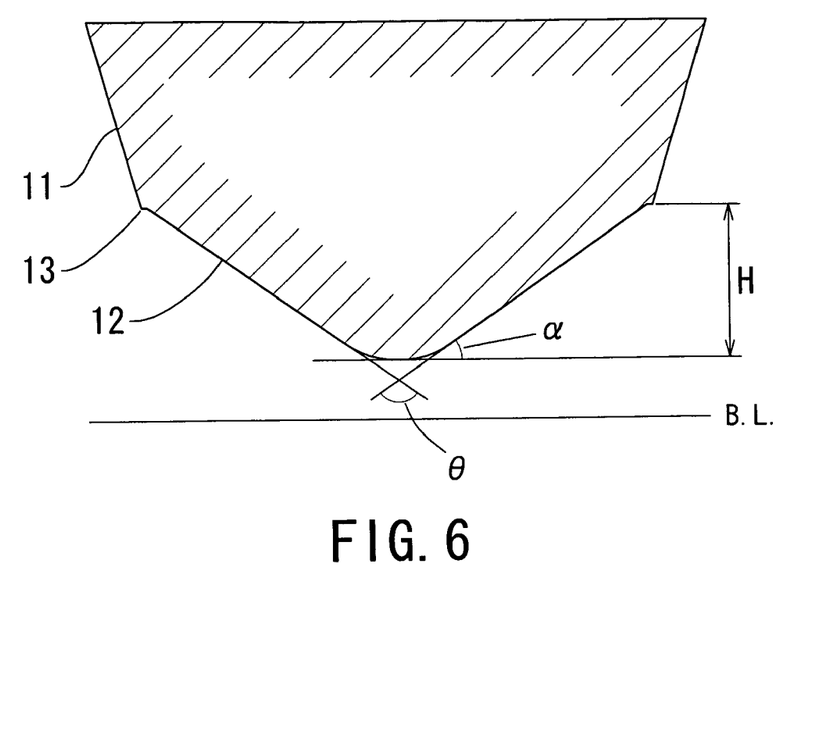
FIG. 6 is a cross-sectional view illustrating the hull structure at a hull position "8" as shown in FIG. 1.
Figure 7:
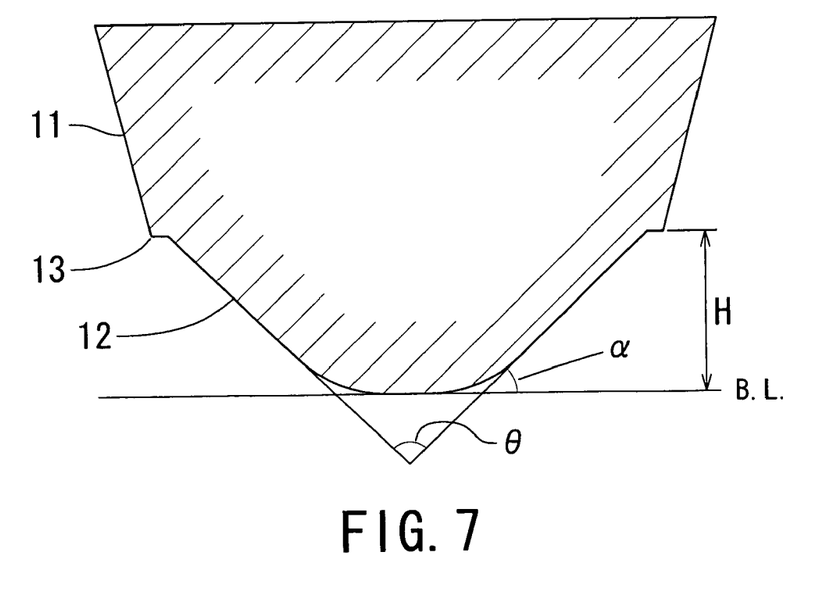
FIG. 7 is a cross-sectional view illustrating the hull structure at a hull position "5" as shown in FIG. 1.

The above-mentioned bottom 12 is made so as to be completely separate by the chine 13 from the broadside 11 at the lower portion of the hull 50. The V-shape of the cross-section of the respective portions of the bottom 12 has an inner angle "θ", which is determined to be within the range of from about 80° to 100° at the central portion 5 of the hull, and preferably as about 80°, as shown in FIGS. 5, 6 and 7. The inner angle "θ" of the V-shape gradually decreases from the bow toward the central portion 5 of the hull, gradually increases from the central portion 5 thereof toward the stern, and becomes about 180° at the end "A" of the stern. In other words, the bottom 12 has a configuration in which an angle "α" of the respective portions of the bottom 12 relative to the horizontal line in the width direction of the hull (i.e., the deadrise), which angle becomes larger from the bow side toward the central portion 5 of the hull, inversely becomes smaller from the central portion 5 thereof toward the stern, and becomes almost 0°.

In addition, a design is made so that the width at the respective portions of the bottom 12 gradually increases from the edge of the chine 12 on the bow side, reach the maximum at the position 8, which is located rearward from the fore "D" to the position corresponding to the quarter of the entire length of the hull on the bow side, and gradually decreases from this position toward the stern, with increase in width of stepped portion of the chine 13. The width of the bottom 12 at the lower end "A" of the stern is determined so as to become equal to about 23% (about 1/4.3) of the entire length of the hull.

The corner portion of the bottom 12, i.e., the tip of the V-shape, is provided with a curved configuration having a smoothly continuous round surface. The curved configuration of the bottom 12 has a width, which gradually increases from the bow side toward the central portion 5 of the hull, reach, at the central portion 5 of the hull, the maximum that is the same as about 1/3.5 of the distance between the opposite chines in the transverse direction of the hull, and gradually decreases from the central portion 5 of the hull toward the stern.

The bottom 12 is designed so that the vertical distance "H" between a horizontal line passing through the chine 13 and another horizontal line passing through the lowermost portion of the bottom 12, which is located directly below the chine, is kept substantially constant within the predetermined region from the central portion 5 of the hull to the bow side, namely, between the central portion 5 of the hull and the position 8, which is located rearward from the fore "D" to the position corresponding to the quarter of the entire length of the hull on the bow side, toward the end "E" of the stern is kept equal to each other and within a range of from about 25% to about 30% of the entire length of the hull. Variation in position of the chine 13 in the transverse direction of the hull within the above-mentioned region is small, with the result that the inner angle "θ" of the V-shape of the cross section of the bottom is kept substantially constant in this region.

The vertical distance "H" between the horizontal line passing through the chine 13 and the other horizontal line passing through the lowermost portion of the bottom 12, which is located directly below the chine, becomes the maximum in the whole hull in any position within the above-mentioned region. The vertical distance "H" in the other region than the above-mentioned region becomes larger from the bow side toward the central portion 5 of the hull, becomes smaller from the central portion 5 of the hull toward the stern, and becomes null at the lower end "A" of the stern.

The chine 13 in the central portion of the hull 50 is provided in a higher position relative to the conventional hull, in accordance with the above-mentioned vertical distance between the chine and the lowermost portion of the bottom, so as to be apart from the draft line, thus reducing frictional resistance between the chine and the water and permitting to cruise at a high speed and low fuel-consumption.

In the central portion 5 of the hull, the vertical distance "H" between the horizontal line passing through the chine 13 and the other horizontal line passing through the lowermost portion of the bottom 12, which is located directly below the chine, is designed to become sufficiently long. Accordingly, it is possible to increase the angle "α" of the respective portions of the bottom 12 relative to the horizontal line in the width direction of the bottom (i.e., the deadrise), and more specifically, to decrease the inner angle "θ" of the V-shape of the cross section of the bottom within the range of about 80° to 100° (see FIG. 7). This makes it possible to buffer the impact from the wave during cruising in wavy conditions, thus providing a comfortable cruising.

The inner angle "θ" of the V-shape of the cross section of the bottom at the central portion 5 of the hull is preferably determined to be within the range of 80° to 100°, and more preferably as about 80°. With a larger angle of the inner angle exceeding the above-mentioned range of angle, the impact from the wave becomes larger, leading to insufficient effects of buffering the impact. With a smaller angle of the inner angle exceeding the above-mentioned range of angle, a space in the hull becomes excessively small, thus causing problems in difficulty in manufacture of the hull and effective utilization of the space.

In addition, on the bow side of the hull 50, the angle "α" of the bottom 12 relative to the horizontal line in the width direction of the bottom 12 (i.e., the deadrise) is designed to be small, and more specifically, the inner angle "θ" of the V-shape of the cross section of the bottom is increased widely, and the inner angle "θ" at the position 8, which is located rearward from the fore "D" to the position corresponding to the quarter of the entire length of the hull on the bow side is designed to be within the range of from about 115° to 125° (see FIG. 6). Even when receiving the following wave during cruising on the water on wavy conditions, the bow may ride easily on the wave, without turning in an undesired direction or rolling due to power of the wave colliding with the bow, thus permitting a stable high-speed cruising even in wavy conditions.

The inner angle "θ" at the position 8, which is located rearward from the fore "D" to the position corresponding to the quarter of the entire length of the hull on the bow side, is preferably designed to be within the range of from about 115° to 125°, and more preferably as 120°. With a smaller angle than the above-mentioned range of angle, sufficient effects of coping with the following wave may not be expected. With a larger angle than the above-mentioned range of angle, impact received from the wave may be increased.

Now, description will be given below of an actual cruising of an example of a boat having the entire length of 12 m, to which the hull structure according to the first embodiment of the present invention is applied, in comparison with a conventional high-speed boat having the same size. The hull of the conventional boat had the width changing significantly in the longitudinal direction of the hull, and the width of the hull at the lowermost portion of the stern was about 1/5.3 of the entire length of the hull. To the contrary, the boat to which the hull structure according to the first embodiment of the present invention was applied, had the width, which was constant the stern and the position 8 as located rearward from the fore "D" to the position corresponding to the quarter of the entire length of the hull on the bow side, and the width of the hull at the lowermost portion of the stern was designed to be widened as the length of about 1/4.3 of the entire length of the hull, thus providing an excellent stability.

In the high-speed planing state, the bow of the hull is lifted up and a contact surface of the hull with the water moves rearward, with the result that the boat planes on the water so that the portion of the bottom in the predetermined region expanding from the central portion 5 of the hull to the bow side breaks the wave. In the conventional hull, the vertical distance between a horizontal line passing through the chine and another horizontal line passing through the lowermost portion of the bottom was short as about 30 cm, and the inner angle "θ" of the V-shape of the cross section of the hull is relatively large as 120°. As a result, the conventional hull was susceptible to impact caused by the wave and it was difficult to cruise on the wave at a high speed. More specifically, the impact caused by the wave and applied to the hull became larger when cruising at a high speed on in stormy weather, thus disabling the boat from cruising actually at a high speed.

To the contrary, in the hull structure according to the first embodiment of the present invention, the vertical distance "H" between a horizontal line passing through the chine 13 and another horizontal line passing through the lowermost portion of the bottom 12 at the central portion 5 of the hull was about 90 cm, which was three times longer than that of the conventional hull, and the inner angle "θ" of the V-shape of the cross section of the hull 12 was relatively small as 90°. As a result, it was possible to reduce remarkably impact caused by the wave and applied to the hull, and even when cruising at a high speed on the stormy weather conditions, the impact applied to the hull became excessively small in comparison with the conventional hull, to permit a comfortable high-speed cruising on the wave, thus enabling the boat to cruise safely in a smooth manner.

In addition, in the hull structure according to the first embodiment of the present invention, the vertical distance "H" between the horizontal line passing through the chine 13 and the other horizontal line passing through the lowermost portion of the bottom 12, which is located directly below the chine, becomes larger than the conventional hull, within the predetermined region between the central portion 5 of the hull and the position 8, which is located rearward from the fore "D" to the position corresponding to the quarter of the entire length of the hull on the bow side, and the position of the chine relative to the water surface becomes higher than the conventional hull. Therefore, frictional resistance of the hull relative to the water may be decreased, thus making it possible to make the boat fast by the same thrust as the conventional boat and making it more fuel-efficient to reach the same speed as the conventional boat.

In the conventional hull, the inner angle "θ" of the V-shape of the cross section of the bottom at the bow side, especially within the region between the fore and the position, which is located rearward from the fore "D" to a position corresponding to the quarter of the entire length of the hull on the bow side, is relatively small as 90°. Therefore, when on conditions in which the wave collided with the bow, for example on condition in which the following waves were generated due to the stormy weather, resistance to the water of the following wave on the bow side was excessively small, thus lacking safety and being difficult in riding on the following waves.

In the hull structure according to the first embodiment of the present invention, the inner angle "e" of the V-shape in cross section of the hull at the position 8, which is located rearward from the fore "D" to the position corresponding to the quarter of the entire length of the hull on the bow side is designed to be within the range of from about 115° to 0.125° so as to be larger than the conventional hull. Accordingly, an angle between the bottom at the bow side and the horizontal line in the transverse direction of the hull becomes small. As a result, resistance to the water of the following wave at the bow becomes large, thus being not susceptible to influence of the following wave even on the stormy weather conditions to permit a safe cruising and providing a safe cruising on the following wave without rolling due to the wave.

According to the first embodiment of the present invention, the hull is designed so that the vertical distance of the respective positional level points of the chine 13 becomes gradually larger with increasing horizontal distance, and the inner angle of the V-shape of the bottom 12 becomes gradually smaller from the bow toward the central portion of the hull and becomes gradually larger from the central portion thereof toward the stern, with the result that the inner angle of the V-shape of the bottom at the central portion of the hull becomes more acute. Therefore, the central portion of the hull, which comes into contact with the water surface during a high-speed cruising, permits to attenuate impact by the wave applied to the bottom 12 and make the impact applied to the bottom at the central portion of the hull small even on the wavy conditions, thus making it possible to achieve a safe and smooth cruising. In addition, the distance from the chine 13 to the bottom becomes larger at the central portion of the hull so that the position of the chine may relatively be located upward away from a draft line, so as to decrease frictional resistance, thus making it possible to make the boat fast by the same thrust as the conventional boat and make it more fuel-efficient to reach the same speed as the conventional boat. Further, the inner angle of the V-shape of the bottom on the bow side is designed to become larger, it is possible to prevent the boat from careening due to influence of the following wave and provide a more stable cruising even on the stormy weather conditions.

The above description describes an example of the small boat having the entire length of 12 m to which the hull structure according to the first embodiment of the present invention has been applied. However, the present invention is not limited only to such an embodiment. More specifically, the present invention is applicable to various kinds of boats, ships and vessels having various sizes. The boats, ships and vessels to which the present invention is to be applied, are not limited only to a specific type such as a fishing boat, and the present invention is applicable to many different boats, ships and vessels.

In the above-described hull structure according to the first embodiment of the present invention, the bottom 12 is described as being composed of continuous flat surfaces and/or curved surface. However, the present invention is not limited only to such an embodiment. The bottom may be provided especially at a position between the central portion of the hull and the stern with additional recesses or stepped portions, which may decrease contact resistance of the bottom with the water during cruising based on a so-called critical layer control technology, permitting to cruise at a high speed and low fuel-consumption.

In the above-described hull structure according to the first embodiment of the present invention, the bottom 12 on the stern side is described as being formed in a substantially flat shape. However, the present invention is not limited only to such an embodiment. More specifically, the bottom may be provided in a predetermined region, which is located directly above a screw propeller disposed below the stern, with a recess so that the screw propeller is placed in a higher position by a distance corresponding to the recess. This makes it possible to decrease an inclination angle of a propeller shaft to decrease resistance applied to the screw propeller, thus improving propulsion efficiency and permitting to cruise at a high speed and low fuel-consumption.

Figure 1:
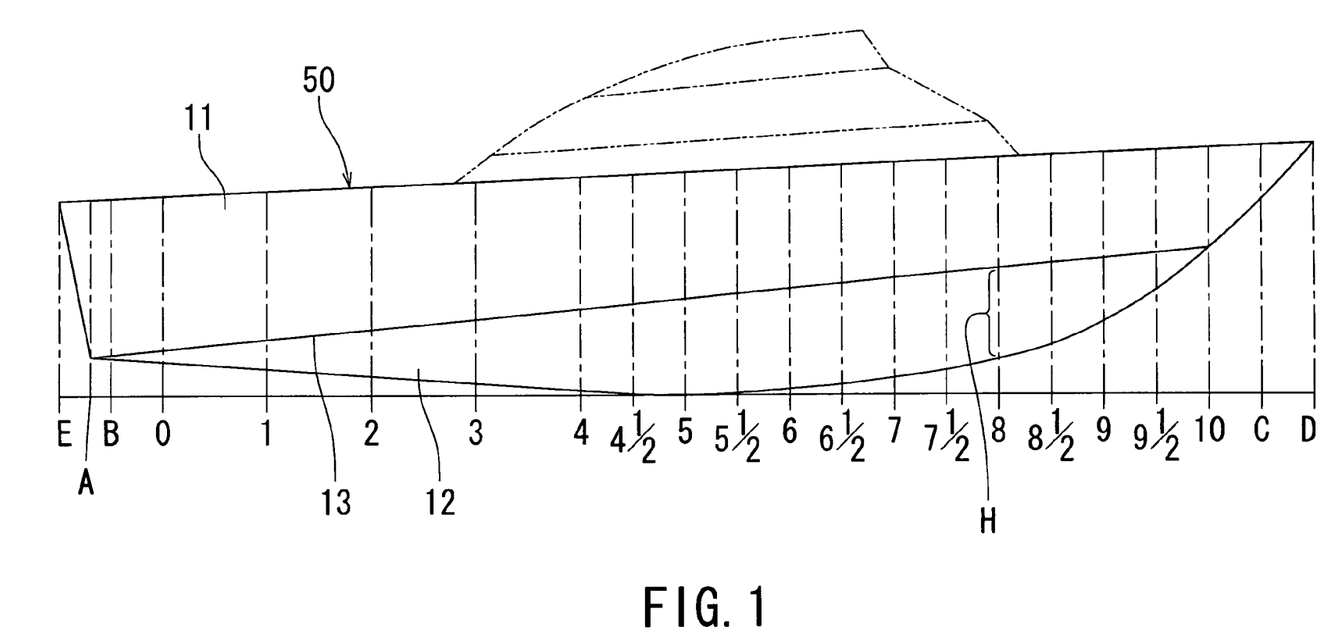
FIG. 1 is a side view illustrating a hull structure according to the first embodiment of the present invention.
Figure 8:
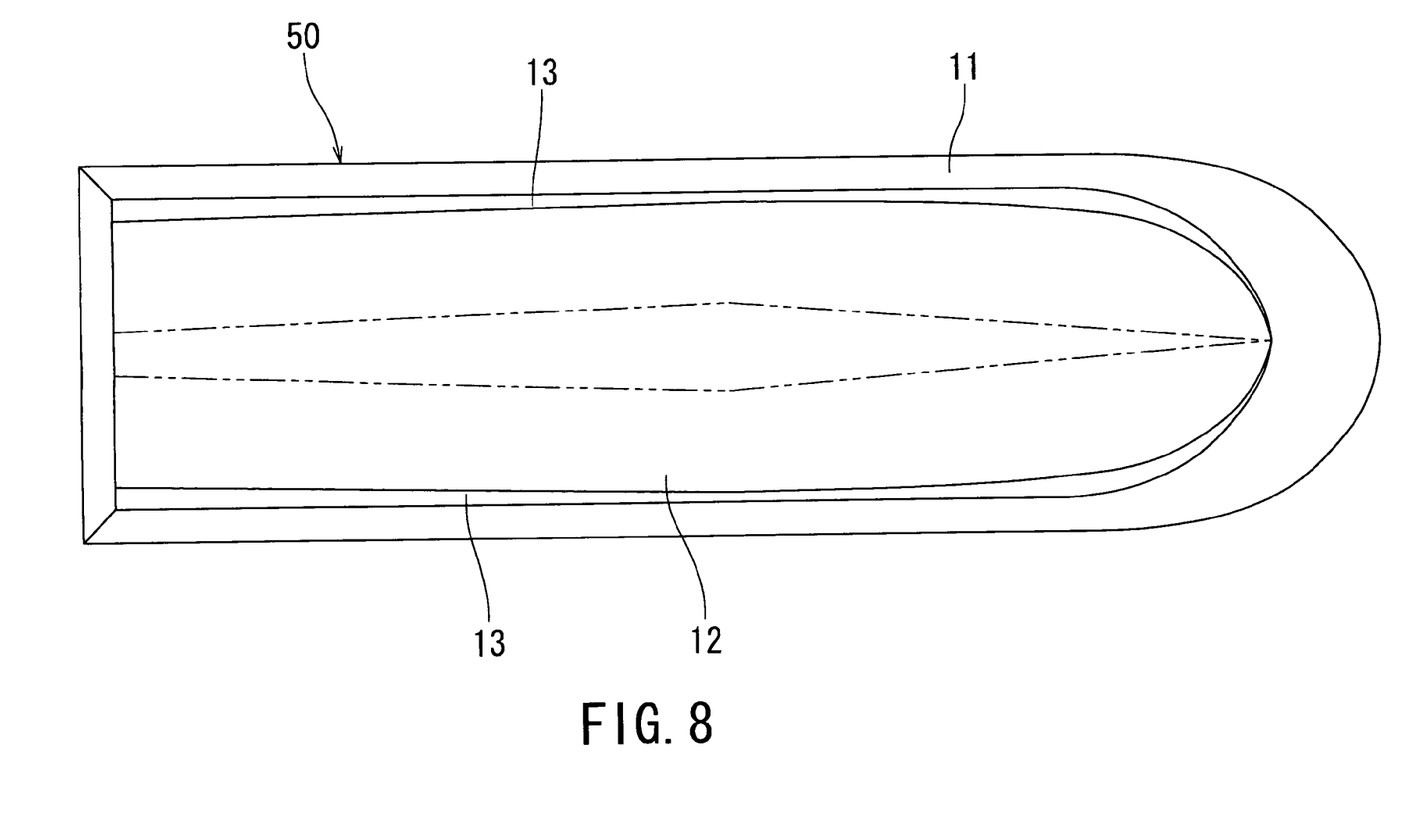
FIG. 8 is a bottom view illustrating the hull structure according to the other embodiment of the present invention.

In the above-described hull structure according to the first embodiment of the present invention, there is described that the width of the stepped portion of the chine 13 gradually increases from the side edge of the bow toward the stern. However, the present invention is not limited only to such an embodiment. More specifically, there may be adopted a configuration in which the width of the stepped portion of the chine 13 increases or decreases in a region between from the bow and the central portion of the hull as shown in FIG. 8, and namely a configuration in which the width of the stepped portion of the chine at the position where, in the bottom view of the hull, a curved line as the chine formed on the bow side becomes a straight line as the chine formed toward the stern (i.e., in hull positions 8 to 8½ as shown in FIG. 1), is determined as the maximum width, and the width in the remaining portion gradually decreases from the bow side toward the central portion of the hull. This enables the stepped portion having the appropriate width in the predetermined region on the bow side to receive power of the wave such as the following wave, to prevent the boat from inclining in an undesirable manner, thus further improving stability relative to the wave. The above-mentioned maximum width is preferably determined in a ratio of about 15 cm to about 20 cm in case of a boat having the entire length of 12 m.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A hull structure comprising:
a chine serving as a boundary between a broadside of a hull and a bottom thereof, wherein:
the hull has a configuration wherein:
the hull has a maximum depth in a vicinity of a central position of the hull;
the chine is provided so that its level position becomes gradually lower from a bow side toward a stern side; and
the bottom has a cross-section having a substantially V-shape from the bow toward the stern, the V-shape having an inner angle becoming gradually smaller within a range of from about 80° to 100° from the bow toward a central portion of the hull becoming gradually larger from the central portion thereof toward the stern and becoming about 180° at an end of the stern and a vertical distance extending between a first horizontal line passing through the chine and a second horizontal line different from the first horizontal line passing through the lowermost portion of the bottom located directly below the chine, the vertical distance becoming larger from the bow side toward the central portion of the hull and becoming smaller from the central portion of the hull toward the stern.

2. The hull structure as claimed in claim 1, wherein:
a difference in level between the chine and a lowermost portion of the bottom, which is located directly below the chine, is kept substantially constant in a predetermined region of the bottom from the central portion of the hull toward the bow.

3. The hull structure as claimed in claim 1, wherein:
the hull has a width in respective portions thereof from a position corresponding to a quarter of an entire length of the hull on the bow side toward the stern is kept substantially constant, said width being within a range of from about 25% to about 30% of the entire length of the hull.

* * * * *